US00RE41617E

(19) United States
(12) Reissued Patent
Lu et al.

(10) Patent Number: US RE41,617 E
(45) Date of Reissued Patent: Aug. 31, 2010

(54) METHOD FOR DETERMINING A LONGITUDINAL VEHICLE BY COMPENSATING INDIVIDUAL WHEEL SPEEDS

(75) Inventors: Jianbo Lu, Livonia, MI (US); Todd Allen Brown, Dearborn, MI (US)

(73) Assignee: Ford Global Technologies & Ford Motor Company, Dearborn, MI (US)

(21) Appl. No.: 11/260,858

(22) Filed: Oct. 27, 2005

Related U.S. Patent Documents

Reissue of:
(64) Patent No.: 6,847,875
Issued: Jan. 25, 2005
Appl. No.: 10/605,841
Filed: Oct. 30, 2003

U.S. Applications:
(60) Provisional application No. 60/450,248, filed on Feb. 26, 2003.

(51) Int. Cl.
*B60G 23/00* (2006.01)

(52) U.S. Cl. ..... 701/38; 701/36; 701/41; 180/282; 280/5.507

(58) Field of Classification Search ..... 701/36, 701/38, 41, 45, 46; 180/271, 282; 280/5.502, 280/5.506, 5.507; 340/440
See application file for complete search history.

(56) References Cited

U.S. PATENT DOCUMENTS 5,216,608 A * 6/1993 Ito et al. ..... 701/90
5,699,251 A * 12/1997 Mori et al. ..... 701/97
5,719,790 A * 2/1998 Lohrenz et al. ..... 702/104
5,720,533 A * 2/1998 Pastor et al. ..... 303/147
5,746,486 A * 5/1998 Paul et al. ..... 303/146
5,788,345 A * 8/1998 Sakane et al. ..... 303/146
5,852,788 A * 12/1998 Toyoda et al. ..... 701/74
5,959,202 A * 9/1999 Nakajima ..... 73/146.2
6,053,583 A * 4/2000 Izumi et al. ..... 303/150
6,055,488 A * 4/2000 Nakajima ..... 702/96
6,120,113 A * 9/2000 Yamazaki et al. ..... 303/116.2
6,192,305 B1 * 2/2001 Schiffmann ..... 701/45
6,212,460 B1 * 4/2001 Rizzo et al. ..... 701/70
6,292,759 B1 * 9/2001 Schiffmann ..... 702/151
6,556,908 B1 * 4/2003 Lu et al. ..... 701/38
6,631,317 B2 * 10/2003 Lu et al. ..... 701/45
6,725,140 B2 * 4/2004 Lu et al. ..... 701/45

FOREIGN PATENT DOCUMENTS

EP 0439191 * 7/1991
EP 0689116 * 12/1995
JP 04-324357 * 11/1992

* cited by examiner

*Primary Examiner*—Gertrude Arthur Jeanglaude
(74) *Attorney, Agent, or Firm*—Angela M. Brunetti; Fredrick Owens

(57) ABSTRACT

A control system (24) for controlling a safety system (40) of an automotive vehicle includes a plurality of wheel speed sensors (30) generating a plurality of wheel velocity signals, a steering angle sensor (39) generating a steering actuator angle signal, a yaw rate sensor (28) generating a yaw rate signal, a lateral acceleration sensor (32) generating a lateral acceleration signal and a controller (26). The controller (26) generates a final reference vehicle velocity in response to the plurality of wheel speed signals, the steering angle signal, the yaw rate signal and the lateral acceleration signal. The controller (26) controls the safety system in response to the final reference vehicle velocity.

21 Claims, 2 Drawing Sheets

METHOD FOR DETERMINING A LONGITUDINAL VEHICLE BY COMPENSATING INDIVIDUAL WHEEL SPEEDS

Matter enclosed in heavy brackets [ ] appears in the original patent but forms no part of this reissue specification; matter printed in italics indicates the additions made by reissue.

CROSS REFERENCE TO RELATED APPLICATIONS

The present invention claims priority to provisional application No. 60/450,248, filed on Feb. 26, 2003, filed simultaneously herewith, the disclosure of which is incorporated by reference.

BACKGROUND OF INVENTION

The present invention relates generally to dynamic control systems for automotive vehicles and, more specifically to a system that compensates wheel speed sensor signals to determine a vehicle reference velocity.

It is a well-known practice to control various operating dynamics of a motor vehicle to achieve active safety. Examples of active safety systems include traction control, yaw stability control and roll stability control systems. A more recent development has been to combine all the available subsystems to achieve better vehicle safety and dynamics performance. The effective operation of the various control systems requires high-accuracy and fast-response-times in the determination of the operating states of the vehicle, regardless of road conditions and driving conditions. Such vehicle operating states include the vehicle longitudinal, lateral and vertical velocities measured along the body-fixed longitudinal, lateral and vertical axes, the attitude of the vehicle body, and the travel course of the vehicle.

One piece of basic information that forms the aforementioned vehicle state estimation is the linear velocity of the rotating centers of the four wheels. For example, this information can be used to assess the wheel slip used in anti-brake-lock controls and traction controls and to estimate the longitudinal velocity of the vehicle. In order to obtain the linear corner velocities, the wheel speed sensors are used. The wheel speed sensors output the products of the wheel rotational speeds and the rolling radii. The wheel rotational speeds are directly measured and the rolling radii are assumed their normal values. During dynamic maneuvers, the variations of the wheel normal loading will affect the rolling radii. Hence, the nominal rolling radii may not reflect the actual rolling radii and thus cause errors in the calculation of the wheel speeds.

It would, therefore be desirable to provide a more accurate way in which to determine the vehicle speed taking into consideration changes in rolling radii.

SUMMARY OF INVENTION

The present invention provides an improved determination of the individual wheel speeds. In the present invention the individual wheel speed calculations may be compensated for by learning the rolling radii of the wheels. Thus, a more accurate determination of the vehicle reference velocity or the longitudinal velocity may be determined.

In one aspect of the invention, a control system 24 for controlling a safety system 40 of an automotive vehicle includes a plurality of wheel speed sensors 30 generating a plurality of wheel velocity signals, a steering angle sensor 39 generating a steering actuator angle signal, a yaw rate sensor 28 generating a yaw rate signal, a lateral acceleration sensor 32 generating a lateral acceleration signal and a controller 26. The controller 26 generates a final reference vehicle velocity in response to the plurality of wheel speed signals, the steering angle signal, the yaw rate signal and the lateral acceleration signal. The controller 26 controls the safety system in response to the final reference vehicle velocity.

In a further aspect of the invention, a method of controlling a safety system for an automotive vehicle having a plurality of wheels includes determining a plurality of wheel velocities for the plurality of wheels, determining a preliminary longitudinal velocity of the vehicle from the plurality of wheel velocities, determining a plurality of correction factors for the plurality of wheel velocities for the plurality of wheels, determining a vehicle reference velocity in response to the plurality of correction factors, the plurality of wheel velocities and the preliminary longitudinal velocity, determining a lateral acceleration, determining a vehicle reference velocity correction factor in response to the lateral acceleration, determining a final reference velocity in response to the vehicle reference velocity correction factor and the vehicle reference velocity, and controlling the safety system in response to the final reference velocity.

Other advantages and features of the present invention will become apparent when viewed in light of the detailed description of the preferred embodiment when taken in conjunction with the attached drawings and appended claims.

DETAILED DESCRIPTION

Figure 1:
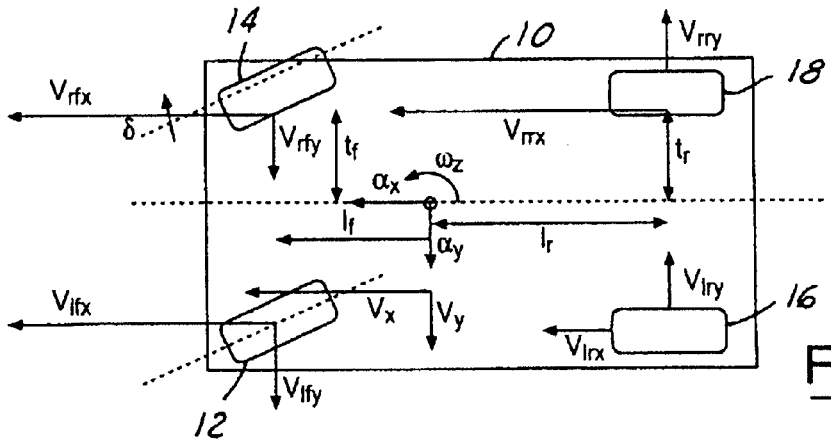
FIG. 1 is a top view of a motor vehicle illustrating various operating parameters of a vehicle experiencing a turning maneuver on a road surface.

In the following figures the same reference numerals will be used to illustrate the same components.

Referring now to FIG. 1, various operating parameters and variables used by the present invention are illustrated as they relate to the application of the present invention to a ground based motor vehicle 10 having wheels 12, 14, 16, 18. Those skilled in the art will immediately recognize the basic physics represented by these illustrations, thereby making the adaptation to different types of vehicles easily within their reach. A lateral and longitudinal velocities of the center of gravity are denoted as $V_x$ and $V_y$, a yaw angular rate is denoted as $\omega_x$, a front wheel steering angle is denoted as $\delta$, lateral acceleration is represented by $a_y$, longitudinal acceleration is represented by $a_x$.

Using those vehicle motion variables, the velocities of the vehicle at the four corner locations, where the wheels are attached to the vehicle, can be calculated in the following form which are projected along the body fixed longitudinal and lateral directions $$V_{lfx}=V_x-\omega_z t_f,\ V_{lfy}=V_y+\omega_z l_f$$

$$V_{rfx}=V_x+\omega_z t_f,\ V_{rfy}=V_y+\omega_z l_f$$

$$V_{lrx}=V_x-\omega_z t_r,\ V_{lry}=V_y-\omega_z l_r$$

$$V_{rrx}=V_y+\omega_z t_r,\ V_{rry}=V_y-\omega_z l_r \quad (1)$$

where $t_f$ and $t_r$ are the half tracks for the front and rear axles, $l_f$ and $l_r$ are the distances between the center of gravity of the vehicle and the front and rear axles. The variables $V_{lf}$, $V_{rf}$, $V_{lr}$ and $V_{rr}$ are the linear velocities of the four corners along the wheel heading directions (left front, right front, left rear and right rear, respectively), which can be calculated as in the following $$V_{lf}=V_{lfx}\cos(\delta)+V_{lfy}\sin(\delta)$$

$$V_{rf}=V_{rfx}\cos(\delta)+V_{rfy}\sin(\delta)$$

$$V_{lr}=V_{lrx}$$

$$V_{rr}=V_{rrx} \quad (2)$$

Figure 2:
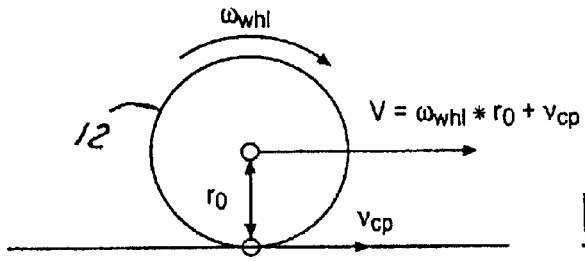
FIG. 2 is a side view of a motor vehicle wheel illustrating various operating parameters of the wheel.

Referring now to FIG. 2, vehicle corner velocity along the wheel longitudinal direction is equal to the sum of the contact patch slip velocity $v_{cp}$ and the product of the wheel rotational rate $\omega_{whl}$ and its rolling radius $r_0$.

Figure 3:
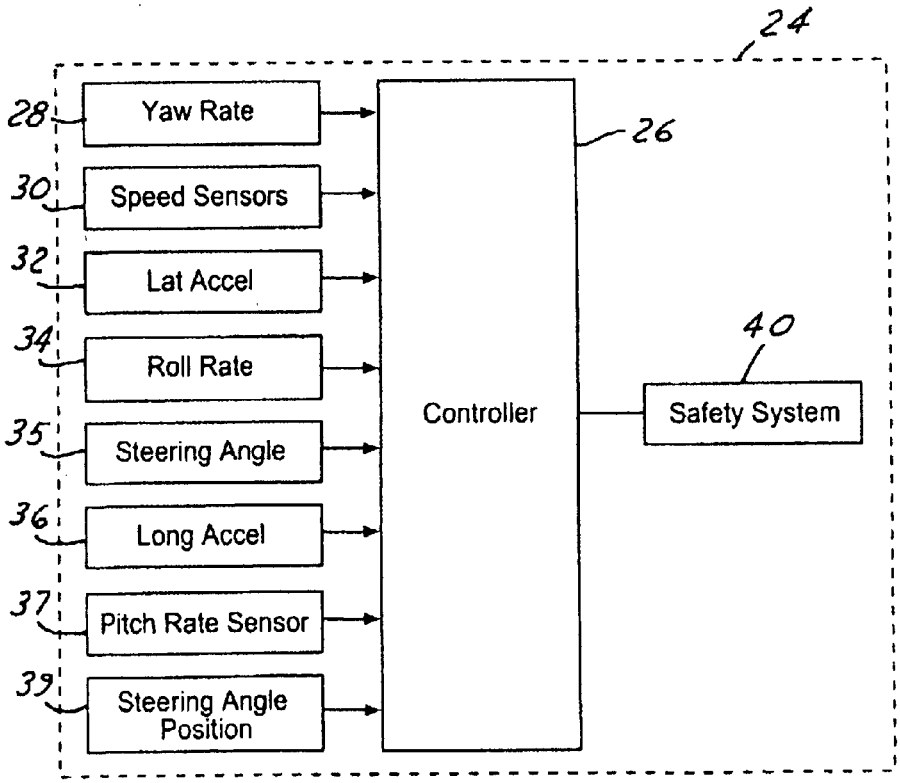
FIG. 3 is a block diagram showing a portion of a microprocessor interconnected to sensors and controlled devices, which may be included in a system according to the present invention.

Referring now to FIG. 3, stability control system 24 has a controller 26 used for receiving information from a number of sensors which may include a yaw rate sensor 28, speed sensors 30 (at each wheel), a lateral acceleration sensor 32, a roll rate sensor 34, a steering angle (hand wheel position) sensor 35, a longitudinal acceleration sensor 36, a pitch rate sensor 37, and steering angle position sensor 39. Steering angle position sensor 39 senses the position of the steered road wheels. Lateral acceleration, longitudinal acceleration, yaw rate, roll orientation and speed may also be obtained using a global positioning system (GPS). Based upon inputs from the sensors, controller 26 controls the safety system 40. Depending on the desired sensitivity, the type of safety system and various other factors, not all the sensors 28–39 may be used in a commercial embodiment. Other factors may be obtained from the sensors such as the surface mu and the vehicle side slip angle, β.

Roll rate sensors 34 and pitch rate sensors 37 may sense the roll condition to be used with a rollover control system as an extension of the present application.

Safety system 40 may be a number of types of safety systems including a roll stability control system, a yaw control system, antilock brakes, traction control, airbags, or active suspension system.

Safety system 40 if implemented may control a position of a front right wheel actuator, a front left wheel actuator, a rear left wheel actuator, or a right rear wheel actuator. Although, as described above, two or more of the actuators may be simultaneously controlled as one actuator. Based on the inputs from sensors 28 through 39, controller 26 determines the vehicle dynamic conditions and controls the safety system. Controller 26 may also use brake control coupled to front right brakes, front left brakes, rear left brakes, and right rear brakes to dynamically control the vehicle. By using brakes in addition to steering control some control benefits may be achieved. For example, yaw control and rollover control may be simultaneously accomplished.

Speed sensor 30 may be one of a variety of speed sensors known to those skilled in the art. For example, a suitable speed sensor may include a sensor at every wheel that is averaged by controller 26. As will be described below, the controller 26 translates the wheel speeds into the speed of the vehicle.

Figure 4:
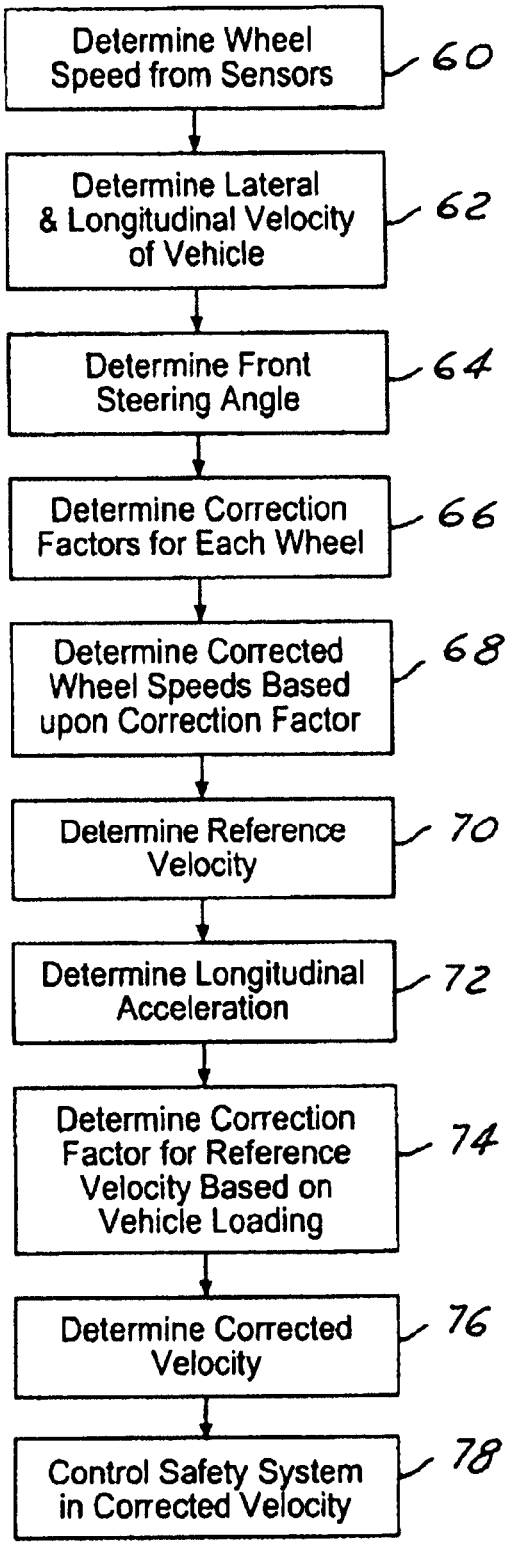
FIG. 4 is a control system block diagram in accordance with the present invention.

Referring now to FIG. 4, a method of operating a safety system using a corrected vehicle velocity is determined. In step 60 the wheel speed sensors are read. In one embodiment each wheel has a separate speed sensor.

The wheel speed sensor outputs usually are calibrated for providing the linear directional velocities $V_{lf}$, $V_{rf}$, $V_{lr}$ and $V_{rr}$ by multiplying the wheel rotational angular speeds with a nominal rolling radius of the wheels. The variables $\omega_{lf\text{-}sensor}$, $\omega_{rf\text{-}sensor}$, $\omega_{lr\text{-}sensor}$ and $\omega_{rr\text{-}sensor}$ are the wheel angular velocity at the left-front corner, right-front corner, left-rear corner and rear-right corner respectively. The nominal rolling radius (typically used in ABS) for calculating wheel speeds from the wheel rotational rates is $r_0$. Thus, the linear directional velocities may be represented by:

$$v_{lf}=\omega_{lf\text{-}sensor}r_0$$

$$v_{rf}=\omega_{rf\text{-}sensor}r_0$$

$$v_{lr}=\omega_{lr\text{-}sensor}r_0$$

$$v_{rr}=\omega_{rr\text{-}sensor}r_0 \quad (3)$$

Notice that the wheels have different rolling radii than $r_0$. Hence, in order to accurately calculate the actual linear velocities at the four corners, correction factors need to be added. The individual correction factors are denoted as $K_{lf}$, $K_{rf}$, $K_{lr}$ and $K_{rr}$ for the left-front, right-front, left-rear and rear-right corners, respectively. Thus, the linear directional velocities may then be represented by:

$$v_{lf}=K_{lf}\omega_{lf\text{-}sensor}r_0$$

$$v_{rf}=K_{rf}\omega_{rf\text{-}sensor}r_0$$

$$v_{lr}=K_{lr}\omega_{lr\text{-}sensor}r_0$$

$$v_{rr}=K_{rr}\omega_{rr\text{-}sensor}r_0 \quad (4)$$

Notice also that the wheels experience not only the rotational motion but also the linear sliding motion, or longitudinal slip. The slip is caused by the relative motion between the wheel and the road at the contact patch (CP). The longitudinal velocities of the relative motions at the contact patches are denoted as $v_{cp\text{-}lf}$, $v_{cp\text{-}rf}$, $v_{cp\text{-}lr}$ and $v_{cp\text{-}rr}$, then the vehicle corner velocities can be expressed as the sums of two speeds as in the following $$V_{lf}=v_{cp\text{-}lf}+v_{lf}$$

$$V_{rf}=v_{cp\text{-}rf}+v_{rf}$$

$$V_{lr}=v_{cp\text{-}lr}+v_{lr}$$

$$V_{rr}=v_{cp\text{-}rr}+v_{rr} \quad (5)$$

The longitudinal and lateral velocities of the vehicle may be determined in step 62 from the sensors, or they may be calculated as in Ford disclosure 201-1057 filed simultaneously herewith, or even a rough estimation by averaging certain variables calculated from wheel speeds. This may be a rough estimate or average but, as mentioned above, does not take into consideration the rolling radius or other factors. Consider $$V_y=V_x\tan(\beta) \quad (6)$$

where β is the vehicle side slip angle $V_y$ is the lateral velocity of the vehicle and $V_x$ is the longitudinal velocity of the vehicle. In step 64, the front steering angle 8 is determined. Then, the individual correction factors $K_{lf}$, $K_{rf}$, $K_{lr}$ and $K_{rr}$ for each wheel can be calculated in step 66 as $$\kappa_{lf} = \frac{V_x[\cos(\delta) + \tan(\beta)\sin(\delta)] + \omega_z[l_f\sin(\delta) - t_f\cos(\delta)]}{\omega_{lf-sensor}r_0} - \frac{v_{cp-lf}}{\omega_{lf-sensor}r_0} \tag{7}$$

$$\kappa_{rf} = \frac{V_x[\cos(\delta) + \tan(\beta)\sin(\delta)] + \omega_z[l_f\sin(\delta) + t_f\cos(\delta)]}{\omega_{rf-sensor}r_0} - \frac{v_{cp-rf}}{\omega_{rf-sensor}r_0}$$

$$\kappa_{lr} = \frac{V_x - \omega_z t_r}{\omega_{lr-sensor}r_0} - \frac{v_{cp-lr}}{\omega_{lr-sensor}r_0}$$

$$\kappa_{rr} = \frac{V_x + \omega_z t_r}{\omega_{rr-sensor}r_0} - \frac{v_{cp-rr}}{\omega_{rr-sensor}r_0}$$

The product term tan (β) sin (δ) is negligible in comparison to cos (δ), hence equation (7) may be further simplified to the following, which is independent of the vehicle side slip angle β

$$\kappa_{lf} \approx \frac{V_x\cos(\delta) + \omega_z[l_f\sin(\delta) - t_f\cos(\delta)]}{\omega_{lf-sensor}r_0} - \frac{v_{cp-lf}}{\omega_{lf-sensor}r_0} \tag{8}$$

$$\kappa_{rf} \approx \frac{V_x\cos(\delta) + \omega_z[l_f\sin(\delta) + t_f\cos(\delta)]}{\omega_{rf-sensor}r_0} - \frac{v_{cp-rf}}{\omega_{rf-sensor}r_0}$$

$$\kappa_{lr} = \frac{V_x - \omega_z t_r}{\omega_{lr-sensor}r_0} - \frac{v_{cp-lr}}{\omega_{lr-sensor}r_0}$$

$$\kappa_{rr} = \frac{V_x + \omega_z t_r}{\omega_{rr-sensor}r_0} - \frac{v_{cp-rr}}{\omega_{rr-sensor}r_0}$$

In the case of small wheel longitudinal slip ratios, the longitudinal velocities $v_{cp-lf}$, $v_{cp-rf}$, $v_{cp-lr}$ and $v_{cp-rr}$ of the relative motions at the contact patches are close to zero, and equation (8) can be further simplified as the following $$\kappa_{lf} \approx \frac{V_x\cos(\delta) + \omega_z[l_f\sin(\delta) - t_f\cos(\delta)]}{\omega_{lf-sensor}r_0} \tag{8}$$

$$\kappa_{rf} \approx \frac{V_x\cos(\delta) + \omega_z[l_f\sin(\delta) + t_f\cos(\delta)]}{\omega_{rf-sensor}r_0}$$

$$\kappa_{lr} = \frac{V_x - \omega_z t_r}{\omega_{lr-sensor}r_0}$$

$$\kappa_{rr} = \frac{V_x + \omega_z t_r}{\omega_{rr-sensor}r_0}$$

The digital value of the above wheel speed individual correction factors $K_{lf}$, $K_{rf}$, $K_{lr}$ and $K_{rr}$ at the time instant t=kΔT are $$K_{lf_k}, K_{rf_k}, K_{lr_k} \text{ and } K_{rr_k}$$

then learning algorithms can be used to calculate the average correction factors. The correction factors are determined using an iterative process that is updated every N calculation samples in the following learning example. Notice that this is a conditional computation which is conducted only if the wheel's longitudinal slip ratios are small.

$$\begin{aligned}
&\text{START} \\
&\text{if} \quad k < N \\
&\quad \bar{\kappa}_{lf_{k+1}} = \bar{\kappa}_{lf_k} + \frac{\kappa_{lf_{k+1}}}{N} \\
&\quad \bar{\kappa}_{rf_{k+1}} = \bar{\kappa}_{rf_k} + \frac{\kappa_{rf_{k+1}}}{N} \\
&\quad \bar{\kappa}_{lr_{k+1}} = \bar{\kappa}_{lr_k} + \frac{\kappa_{lr_{k+1}}}{N} \\
&\quad \bar{\kappa}_{rr_{k+1}} = \bar{\kappa}_{rr_k} + \frac{\kappa_{rr_{k+1}}}{N} \\
&\quad k = k + 1 \\
&\text{elseif } k = N \\
&\quad k = 0 \\
&\quad \bar{\kappa}_{lf} = \bar{\kappa}_{lf_{N+1}} \\
&\quad \bar{\kappa}_{rf} = \bar{\kappa}_{rf_{N+1}} \\
&\quad \bar{\kappa}_{lr} = \bar{\kappa}_{lr_{N+1}} \\
&\quad \bar{\kappa}_{rr} = \bar{\kappa}_{rr_{N+1}} \\
&\quad \text{go to START}
\end{aligned} \tag{10}$$

Using the above learning algorithm, corrected wheel speeds at each wheel can be determined in step 66 based upon the learned correction factor.

$$\begin{aligned}
\hat{v}_{lf_k} &= \bar{K}_{lf} r_0 \omega_{lf\text{-}sensor_k} \\
\hat{v}_{rf_k} &= \bar{K}_{rf} r_0 \omega_{rf\text{-}sensor_k} \\
\hat{v}_{lr_k} &= \bar{K}_{lr} r_0 \omega_{lr\text{-}sensor_k} \\
\hat{v}_{rr_k} &= \bar{K}_{rr} r_0 \omega_{rr\text{-}sensor_k}
\end{aligned} \tag{11}$$

Notice that the above learning algorithm only corrects the individual wheel speeds. There are cases when the average rolling radii of the four wheels are reduced together due to vehicle loading change. Feeding back the above corrected wheel speeds to the algorithms used in vehicle dynamics control will provide a vehicle reference velocity $$\hat{V}_{ref}$$

in step 70 which needs to be further calibrated against the available vehicle longitudinal acceleration sensor signal.

Consider that the actual vehicle reference velocity is $$V_{ref} = K\hat{V}_{ref} \tag{12}$$

where K is the global correction factor due to the total vehicle loading. K is usually a slow time varying parameters $$K\hat{V}_{ref} = a_x - g\theta_y \tag{13}$$

where $\theta_y$ is the vehicle pitch angle generated from a pitch angle sensor or calculated from the pitch rate sensor signal.

In step 72, the longitudinal acceleration $a_x$ is determined. Then, the following variables are defined $$\hat{V} = \begin{bmatrix} \hat{v}_{ref_1} \\ \hat{v}_{ref_2} \\ \vdots \\ \hat{v}_{ref_N} \end{bmatrix}, A_x = \begin{bmatrix} a_{x_1} \\ a_{x_2} \\ \vdots \\ a_{x_N} \end{bmatrix}, \Theta_y = \begin{bmatrix} \theta_{y_1} \\ \theta_{y_2} \\ \vdots \\ \theta_{y_N} \end{bmatrix}, \tag{14}$$

Then a least square computation of the correction factor due to loading can be determined in step 74 as the following:

$$\hat{K} = \text{inv}(\hat{V}^T\hat{V})\hat{V}^T[A_x - g\Theta_y] \tag{15}$$

or in the following form $$\hat{K} = \frac{\sum_{k=M+1}^{M+N} \hat{v}_{ref_k}(a_{x_k} - g\theta_{y_k})}{\sum_{k=M+1}^{M+N} \hat{v}_{ref_k}^2} \quad (16)$$

Notice that the global correction factor $$\hat{K}$$

is updated every N computational samples when the wheels have small longitudinal slip ratios. The digital implementation of equation (16) can be obtained as in the following where $V_{k+1}$ is the updated reference velocity determined in step 76.

START if $k < N$ $A_{k+1} = A_k + \hat{v}_{ref_{k+1}}(a_{x_{k+1}} - g\theta_{y_{k+1}})$ $V_{k+1} = V_k + \hat{v}_{ref_{k+1}}\hat{v}_{ref_{k+1}}$ $k = k + 1$ elseif $k = N$ $\hat{\kappa} = \frac{A_{N+1}}{V_{N+1}}$ $k = 0$ go to START The final corrected wheel speed sensor signals may be corrected by the aforementioned factors can also be obtained as the following:

$$\hat{v}_{lf_k} = \hat{K}\overline{K}_{lf} r_0 \omega_{lf\text{-}sensor_k}$$

$$\hat{v}_{rf_k} = \hat{K}\overline{K}_{rf} r_0 \omega_{rf\text{-}sensor_k}$$

$$\hat{v}_{lr_k} = \hat{K}\overline{K}_{lr} r_0 \omega_{lr\text{-}sensor_k}$$

$$\hat{v}_{rr_k} = \hat{K}\overline{K}_{rr} r_0 \omega_{rr\text{-}sensor_k} \quad (17)$$

Once the corrected final vehicle reference velocity is determined, the safety system 40 may be controlled using the compensated velocity values.

While particular embodiments of the invention have been shown and described, numerous variations and alternate embodiments will occur to those skilled in the art. Accordingly, it is intended that the invention be limited only in terms of the appended claims.

What is claimed is:

1. A control system for controlling a safety system of an automotive vehicle comprising:

a plurality of wheel speed sensors generating a plurality of wheel velocity signals;

a steering angle sensor generating a steering actuator angle signal;

a yaw rate sensor generating a yaw rate signal;

a [lateral] *longitudinal* acceleration sensor generating a [lateral] *longitudinal* acceleration signal; and a controller coupled to the plurality of wheel speed sensors, the steering actuator angle sensor, the yaw rate sensor, the [lateral] *longitudinal* acceleration sensor, said controller generating a final reference vehicle velocity in response to the plurality of wheel velocity signals, the steering angle signal, the yaw rate signal and the [lateral] *longitudinal* acceleration signal, said controller controlling the safety system in response to the final reference vehicle velocity.

2. A control system as recited in claim 1 wherein the safety system comprises a rollover control system.

3. A control system as recited in claim 1 wherein the safety system comprises a yaw control system.

4. A control system as recited in claim 1 wherein the safety system comprises an antilock brake system.

5. A control system as recited in claim 1 wherein the final reference vehicle velocity is determined in response to a learning function.

6. A control system for an automotive vehicle comprising:

a plurality of wheel speed sensors generating a plurality of wheel velocity signals;

a [lateral] *longitudinal* acceleration sensor generating a [lateral] *longitudinal* acceleration signal;

a safety system; and a controller coupled to the plurality of wheel speed sensors, the [lateral] *longitudinal* acceleration sensor and the safety system, said controller determining a preliminary longitudinal velocity of the vehicle from the plurality of wheel velocity signals, determining a plurality of correction factors for the plurality of wheel velocity signals, determining a vehicle reference velocity in response to the plurality of correction factors, the plurality of wheel velocities and the preliminary longitudinal velocity, determining a vehicle reference velocity correction factor in response to the [lateral] *longitudinal* acceleration, determining a final reference velocity in response to the velocity correction factor and the vehicle reference velocity, said controller controlling the safety system in response to the final reference vehicle velocity.

7. A control system as recited in claim 1 wherein the safety system comprises a rollover control system.

8. A control system as recited in claim 1 wherein the safety system comprises a yaw control system.

9. A control system as recited in claim 1 wherein the safety system comprises an antilock brake system.

10. A control system as recited in claim 1 wherein determining a plurality of correction factors is performed using a learning function.

11. A control system as recited in claim [1] *10* wherein the learning function averages N correction factors, where N is an integer.

12. A control system as recited in claim 1 further comprising said controller determining a nominal rolling radius, wherein the wheel velocity is a function of vehicle speed.

13. A method of controlling a safety system for an automotive vehicle having a plurality of wheels comprising:

determining a plurality of wheel velocities for the plurality of wheels;

determining a preliminary longitudinal velocity of the vehicle from the plurality of wheel velocities;

determining a plurality of correction factors for the plurality of wheel velocities for the plurality of wheels;

determining a vehicle reference velocity in response to the plurality of correction factors, the plurality of wheel velocities and the preliminary longitudinal velocity;

determining a [lateral] *longitudinal* acceleration;

determining a vehicle reference velocity correction factor in response to the [lateral] *longitudinal* acceleration;

determining a final reference velocity in response to the vehicle reference velocity correction factor and the vehicle reference velocity; and controlling the safety system in response to the final reference velocity.

14. A method as recited in claim 13 further comprising determining a yaw rate determining a plurality of preliminary [lateral] *longitudinal* velocity of the vehicle from the plurality of wheel speeds and the yaw rate.

15. A method as recited in claim 13 further comprising determining a front steering angle, wherein determining a plurality of correction factors are determined in response to the front steering angle.

16. A method as recited in claim 13 wherein said safety system comprises at least one selected from a rollover stability control system, a yaw control system, a traction control system or an antilock brake control system.

17. A method as recited in claim 13 further comprising using a learning function in the step of determining a plurality of correction factors.

18. A method of controlling a safety system for an automotive vehicle having a plurality of wheels comprising:

determining a plurality of wheel velocities for the plurality of wheels;

determining a yaw rate;

determining a preliminary longitudinal velocity of the vehicle from the plurality of wheel velocities and the yaw rate;

determining a front steering angle;

determining a plurality of correction factors for the plurality of preliminary wheel speeds in response to the front steering angle;

determining a vehicle reference velocity in response to the plurality of correction factors and the plurality of correction factors and the preliminary longitudinal velocity.

19. A method as recited in claim 18 further comprising determining a [lateral] *longitudinal* acceleration;

determining a velocity correction factor in response to the [lateral] *longitudinal* acceleration; and determining a final reference velocity in response to the velocity correction factor and the vehicle reference velocity.

20. A method as recited in claim 18 further comprising using a learning function in the step of determining a plurality of correction factors.

21. A method as recited in claim 18 wherein said safety system comprises at least one selected from a rollover stability control system, a yaw control system, a traction control system or an antilock brake control system.

* * * * *